(12) United States Patent
Muramatsu

(10) Patent No.: US 6,867,407 B2
(45) Date of Patent: Mar. 15, 2005

(54) LIGHT PROBE MICROSCOPE INCLUDING PICTURE SIGNAL PROCESSING MEANS

(75) Inventor: Hiroshi Muramatsu, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 487 days.

(21) Appl. No.: 10/027,061

(22) Filed: Dec. 26, 2001

(65) Prior Publication Data

US 2002/0088919 A1 Jul. 11, 2002

(30) Foreign Application Priority Data

Jan. 11, 2001 (JP) ........................................ 2001-004059
Jun. 22, 2001 (JP) ........................................ 2001-189784

(51) Int. Cl.⁷ .............................................. G02B 7/04
(52) U.S. Cl. ................................... 250/201.3; 250/306
(58) Field of Search ............................ 250/201.3, 306, 250/307, 234, 235, 208.1

(56) References Cited

U.S. PATENT DOCUMENTS 6,229,609 B1 * 5/2001 Muramatsu et al. ......... 356/601

* cited by examiner

*Primary Examiner*—Que T. Le
(74) *Attorney, Agent, or Firm*—Adams & Wilks

(57) ABSTRACT

A light probe microscope has a probe having a tip, a mechanism for positioning the probe tip closely to a sample surface and causing two-dimensional scanning movement between the probe tip and the sample, a light source for emitting light to an area proximate the probe tip and the sample, a two-dimensional image sensor for receiving the light radiated from the sample and producing a two-dimensional image of the sample in accordance therewith, and a device for producing a light image based on a signal intensity of light in a detection region of the two-dimensional image.

32 Claims, 4 Drawing Sheets

LIGHT PROBE MICROSCOPE INCLUDING PICTURE SIGNAL PROCESSING MEANS

BACKGROUND OF THE INVENTION

1. Field of the Invention

The present invention relates to a light probe microscope for observing the shape of a sample surface and observing optical information of the sample surface by utilizing a force acting between a probe and a sample, or the like.

2. Description of the Related Art

A proximity field optical microscope (light probe microscope) utilizing a proximity field light emitted from the microscopic optical aperture of a probe tip or a scattered light at a sharp tip is a known device that is capable of performing optical observation with a high resolving power exceeding a restriction of the wavelength of light. By using the light probe microscope, it is possible to observe an optical picture with a resolving power exceeding an optical image which has been measured by using a conventional optical microscope and a highly sensitized camera and, at the same time, a surface shape can be observed as well.

In the light probe microscope, it is necessary to detect a weak light such as scattered light and fluorescent light radiated from the sample surface adjoining the light field locally existing at the probe tip. However, in the conventional light probe microscope, there are used a photomultiplier and an avalanche photodiode as a light detector.

Since a feeble light is detected in the light probe microscope, stray light is picked up in the photomultiplier whose light-intercepting face is large, so that noise becomes high. For example, where light from a probe having an optical aperture of 100 nm is converged by an objective lens having a magnification of 100 times, a size corresponding to the aperture becomes 10 $\mu$m in a primary picture. In contrast to this, a size of the light-intercepting face of the photomultiplier is several mm to several tens of mm, so that a major region does not contribute to detection, reacts with the stray light, and becomes a source of a dark count noise. In order to eliminate the stray light, it has been considered to insert a pin hole to an image formation face, but it is a very difficult operation to align an optical axis of the feeble light therewith. On the other hand, in the avalanche photodiode, the light-intercepting face is as relatively small as about 200 to 500 $\mu$m, so that it is not easily influenced by the stray light. However, also in this case, it is necessary to align the optical axis, so that a measuring operation becomes complex.

SUMMARY OF THE INVENTION

As a method which does not detect the stray light in a region other than the detection region and, further, does not need to perform the optical axis alignment, there has been devised a constitution in which a two-dimensional image is obtained in real time by using a two-dimensional image sensor, and the signal strength of an optional detection region in the two-dimensional image is obtained by picture signal processing means. By taking-in the signal simultaneously with a shape picture by data collecting means, it became possible to obtain a two-dimensional light picture simultaneously with the shape picture similarly to a case in which a conventional detector was used.

That is, in the present invention, there has been realized a light probe microscope having a probe capable of generating light field locally existing in a tip portion, probe position detecting means for controlling a distance between a tip of the probe and a sample to an adjoining distance, tremor or oscillating means, and control means, scan means for two-dimensionally scanning the probe on a sample surface, a light source for generating the locally existing light field, an optical system for converging a light radiated from the sample surface adjoining the probe tip, and data collecting means, characterized in that a two-dimensional image of the sample surface is obtained in real time by two-dimensional image snesor, and a two-dimensional light image is extracted simultaneously with a shape image by means of obtaining a signal intensity of an optional detection region in the two-dimensional image by picture signal processing means.

Further, it becomes possible to selectively obtain a light signal of specified wavelength by disposing a spectroscope in a front stage of the two-dimensional image sensor. Besides, by means of constructing the converging optical system with an optical system containing a polarizer and a mirror, different polarization components can be made to form images in separate positions on the two-dimensional image sensor, and either polarization component can be selectively detected. Similarly, by constructing the converging optical system by an optical system containing a dichroic mirror and another mirror, different wavelength components can be made to form images in separate positions on the two-dimensional image sensor, and either wavelength component can be selectively detected. Here, a plurality of the detections region are simultaneously set and plural light images can be simultaneously obtained. By this, it is made possible to observe plural light images without using plural detectors.

Incidentally, in the picture signal processing means, signal processing is performed by means of digitizing a video signal, calculating a light intensity of the detection region, and transmitting it to the data collecting means as a digital value intact or after being converted into an analog value.

On the other hand, it is also possible by an external data collecting unit other than the data collecting means to obtain a picture synchronizing with the shape image by means of transmitting a data obtaining trigger signal from the data collecting means.

Incidentally, according to knowledge of the present inventor, there is an example in which the two-dimensional image sensor is utilized as observing means in order to examine a scattered state of the light from the probe, but there is no example in which it is used as a light detector in a probe scanning time.

DETAILED DESCRIPTION OF THE PREFERRED EMBODIMENT

Hereunder, an embodiment of the present invention with reference to the attached drawings.

Figure 1:
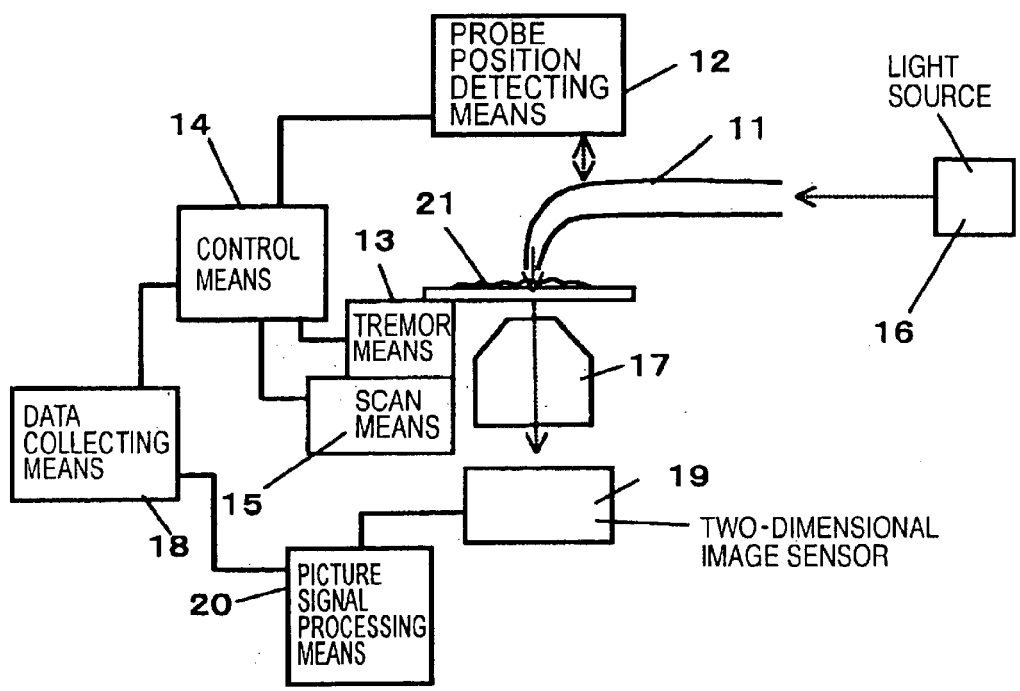
FIG. 1 is a diagram showing a constitution of a light probe microscope of the present invention.
Figure 2A:
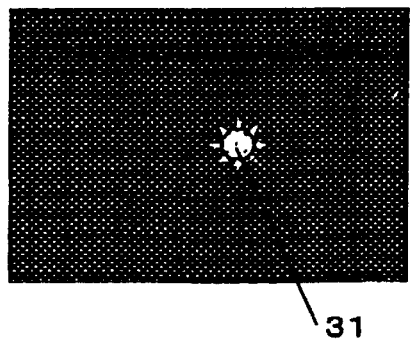
FIG. 2 is an explanatory view showing a method of a light detection in the light probe microscope of the present invention.
Figure 2B:
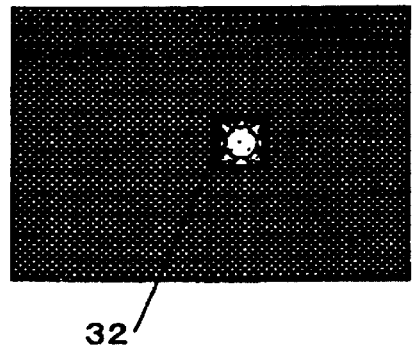

FIG. 1 shows one constitutional diagram of a light probe microscope of the present invention. In FIG. 1, it has a probe 11 having a light field locally existing in the vicinity of a tip portion thereof, probe position detecting means 12 for detecting a distance between a tip of the probe 11 and a sample to an adjoining distance, tremor or oscillating means 13 and control means 14 for controlling the distance between the probe tip 11 and the sample, scan means 15 for two-dimensionally scanning the probe on a sample surface, a light source 16 for generating the light field locally existing in the vicinity of the probe tip, an optical system 17 for converging a light radiated from a sample 21 surfaces adjoining a probe 11 tip, and data collecting means 18, and further has a two-dimensional image sensor 19, and picture signal processing means 20. Here, a two-dimensional image on the sample 21 surface is obtained in real time by the two-dimensional image sensor 19, and it is made possible to optionally obtain a signal strength of a detection region in the two-dimensional image by the picture signal processing means 20. Concretely, in case that a tip of the probe 11 is adjacent to the surface of the sample 21, the scattered light generated between the probe and the sample is observed as such a spot-like bright point 31 shown in FIG. 2A on the two-dimensional image sensor 19 placed in an image formation face. Here, by designating a range 32 (FIG. 2B) surrounding the pixels of a portion of the bright point 31 to thereby obtain a brightness of this portion in real time and by transferring it to the data collecting means 18, a data of a light intensity can be obtained simultaneously with a shape information, so that there can be realized a light probe microscope for simultaneously observing the shape picture and the two-dimensional light picture.

In this manner, by designating a measuring region in agreement with the bright point, it is possible to eliminate the problem in which excessive stray light is detected by a detector having a light-intercepting face that is large with respect to the size of the bright point, and the problem of the optical axis alignment when a detector having a small light-intercepting face in the order of the bright point is used. Particularly, in case of a micro light cantilever using a micro processing technique, it follows that an excited light is directly introduced from a back side of the micro aperture, but in this constitution there is a case that the light leaks from a side face of the cantilever, and a system of the present invention is particularly useful in a point that only the light of the aperture portion is detected.

The picture processing means 20 used here is composed at least of image signal inputting means, picture data processing means, and data outputting means. Among these, by means of obtaining the two-dimensional image as a video signal by the image inputting means, a signal of optical information can be updated by a video rate.

Besides, in the picture signal inputting means, it is also possible to perform a signal processing by means of digitizing the video signal, calculating a light intensity of the detection region by the picture data processing means, and sending it to the data collecting means 18 from the data outputting means while being left as a digital value intact or while being converted into an analog value. In this occasion, as a processing in the picture processing means 20, there are repeatedly performed a previous taking-in/display of the picture signal for setting a range, an image taking-in for one frame after performing the setting of the measuring range, a calculation of the light intensity of the set range, and a signal output. In case that a usual video signal of 30 Hz is used, it follows that a data transmission is repeatedly performed at about 33 mS. If a CCD camera in which a further higher speed heading is possible is used, it is also possible to perform a higher data transmission. In addition, it is also possible to constitute the picture processing means wholly with analog circuits.

Figure 3:
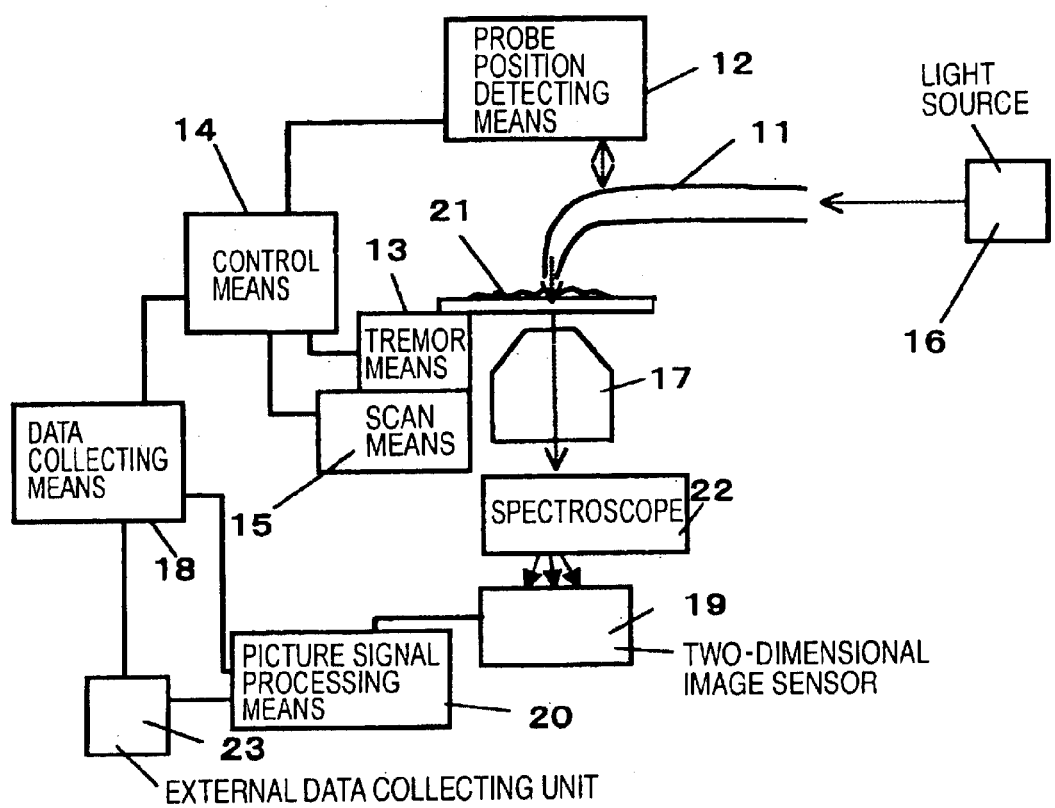
FIG. 3 is a diagram showing a constitution of the light probe microscope of the present invention.

Further, as shown in FIG. 3, by disposing a spectroscope 22 in a front stage of the two-dimensional image sensor, it is possible to project a spectrum contained in the light from the bright point onto the image sensor and, by this, it is possible to obtain the light signal of a specified wavelength by selecting it.

Figure 4A:
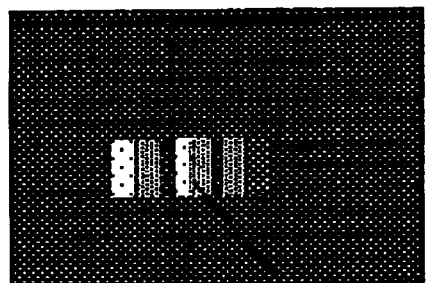
FIG. 4 is an explanatory view showing a light detection of the light probe microscope of the present invention.
Figure 4B:
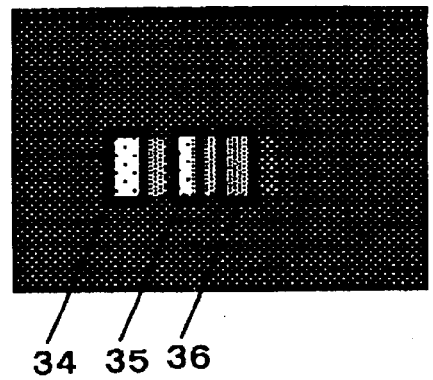

Particularly, as shown in FIGS. 4A and 4B, in an observation of the spectrum, it is possible to simultaneously obtain plural light pictures by simultaneously setting plural detection regions of the spectrum. In FIG. 4A, there is shown a spectrum band 33 and, in FIG. 4B, there are shown designating ranges 34, 35, 36 surrounding a part of the spectrum band.

By setting the detection region for each of plural different wavelength components in this manner, it is possible to obtain a light picture of each different wavelength component. By means of varying the selected wavelength width in a wavelength direction by continuously narrowing it, it is possible to obtain a light picture for every fine wavelength component, and it is also possible, on the basis of the light picture for every wavelength component, to perform extraction of a spectral spectrum in an optional measuring point in a scanning region. By changing a size of the region of the measuring point for the extraction, it is also possible to adjust a face resolving power in the sample face of the spectrum information, an S/N ratio of the spectrum itself, and the like.

On the other hand, by means of setting the wavelength of the excited light in the probe tip such that it becomes outside an image region of the two-dimensional image sensor by the spectroscope, it is possible to set the range of a light detecting sensitivity at the two-dimensional image sensor so as to match with a weak light other than the excited light, so that it is also possible to improve an S/N ratio of the wavelength signal other than the excited light.

Like FIG. 3, also in case that the spectroscope is disposed, by making a slit of the spectroscope into a switching type between the slit and a complete aperture, and setting a diffraction grating to a mirror position or making it possible to be changed with the mirror, it is also possible to perform an operation similar to a device constitution having no spectroscope shown in FIG. 1.

Figure 5:
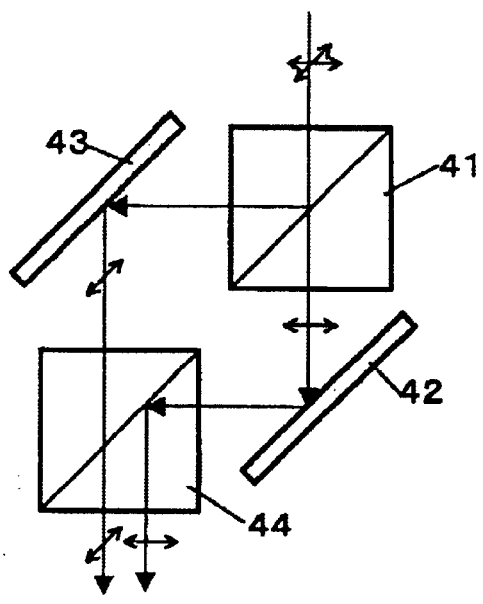
FIG. 5 is a diagram showing an optical system contained in a converging optical system used in the present invention.
Figure 6:
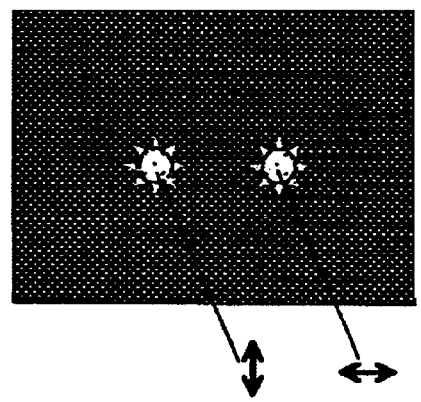
FIG. 6 is a view showing one example of an image on a two-dimensional image sensor in the present invention.

In FIG. 5, there is shown an example adapted such that different polarization components form images in respectively separate positions in the two-dimensional image sensor by means of constituting a converging optical system by an optical system containing a polarizer and a mirror. In FIG. 5, a light containing two polarization components enters into a polarization beam splitter 41 and is separated into two polarization components. The two polarization components enter into a next polarization beam splitter 44 by mirrors 42, 43. However, on this occasion, different polarization components can form images in respectively separated positions by causing the optical axes not to overlap. In this case, the polarization beam splitter 44 can be replaced with a half mirror type beam splitter. By using such an optical system, it became possible to detect the polarization component by selecting it. FIG. 6 shows an image on a two-dimensional image sensor on this occasion. FIG. 6 shows an image on the two-dimensional image sensor on this occasion. By respectively, simultaneously range-designating the two bright point portions, it is possible to simultaneously obtain picture images of the two polarization components.

Figure 7:
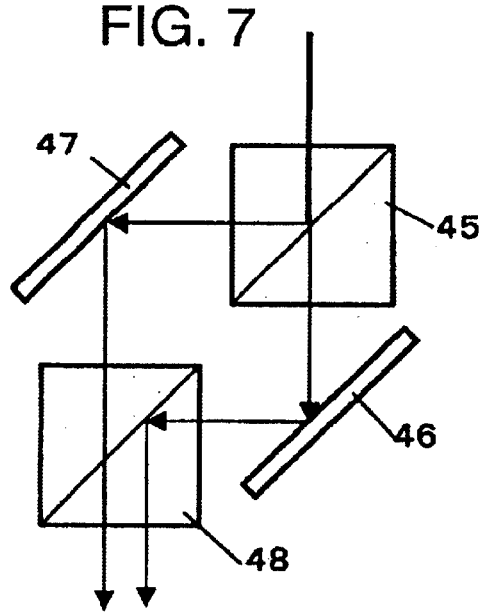
FIG. 7 is a diagram showing an optical system contained in a converging optical system used in the present invention.
Figure 8:
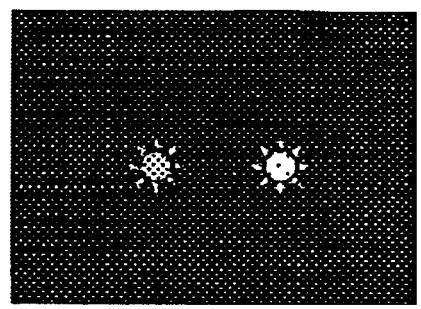
FIG. 8 is a view showing one example of the image on the two-dimensional image sensor in the present invention.

Similarly, in FIG. 7, there is shown an example adapted such that the different wavelength components respectively form images in separated positions to the two-dimensional image sensor by means of constituting the converging optical system by an optical system containing a dichroic mirror and a mirror. In FIG. 7, a light containing the wavelength components of a certain range enters into a dichroic mirror 45, and is separated into two wavelength components. By mirrors 46, 47, the two wavelength components enter into a next dichroic mirror 48. However, on this occasion, different wavelength components can form images in respectively separated positions by causing the optical axes not to overlap. In this case, the dichroic mirror 48 can be replaced with a half mirror type beam splitter. By using such an optical system, it became possible to detect the wavelength component by selecting it. FIG. 8 shows an image on the two-dimensional image sensor on this occasion. By respectively, simultaneously range-designating the two bright point portions, it is possible to simultaneously obtain picture images of the two polarization components.

On the other hand, by transmitting a data obtaining trigger signal from the data collecting means 18 in agreement with an obtainment of a shape signal, it is also possible to obtain a picture image synchronizing with a shape image by an external data collecting unit 23 other than the data collecting means. As a processing in the picture processing means 20 on this occasion, it is possible to obtain a picture image synchronizing with the shape picture by performing a previous picture signal taking-in/display for a range setting, and setting of the measuring range, when a trigger signal is detected, the data for several trigger signals to the external data collecting unit 23 while repeating a taking-in of the picture for one frame, a calculation of the light intensity in a set range, and a signal output. In this case, by enhancing the processing capabilities of the picture processing means 20 and the external data collecting means 23, it is also possible to continuously take-in/preserve an image for every one frame of the two-dimensional image sensor in compliance with the trigger signal as it is. Besides, it is also possible to preserve only a selected range portion in the frame and, in this case, there is an effect that the processing speed is improved and a recording capacity is economized.

Besides, in case that a scanning speed is low and the frame can be obtained in several times during one cycle of the trigger signal, it is also possible to enhance a measurement accuracy by adding the obtained data or performing an average processing.

Here, in FIG. 1 and FIG. 3, as to the probe, there is shown a type which is composed of an optical waveguide and has in its tip a micro optical aperture of less than a wavelength of the light. However, in addition to this, it is also possible to use a non-aperture type probe in which the light is irradiated to a needle having a sharp tip. In the former, there is used an optical fiber probe manufactured by the optical fiber or a minute aperture micro optical probe manufactured by a micro processing technique and, in the latter, there is used a metal needle.

Figure 9:
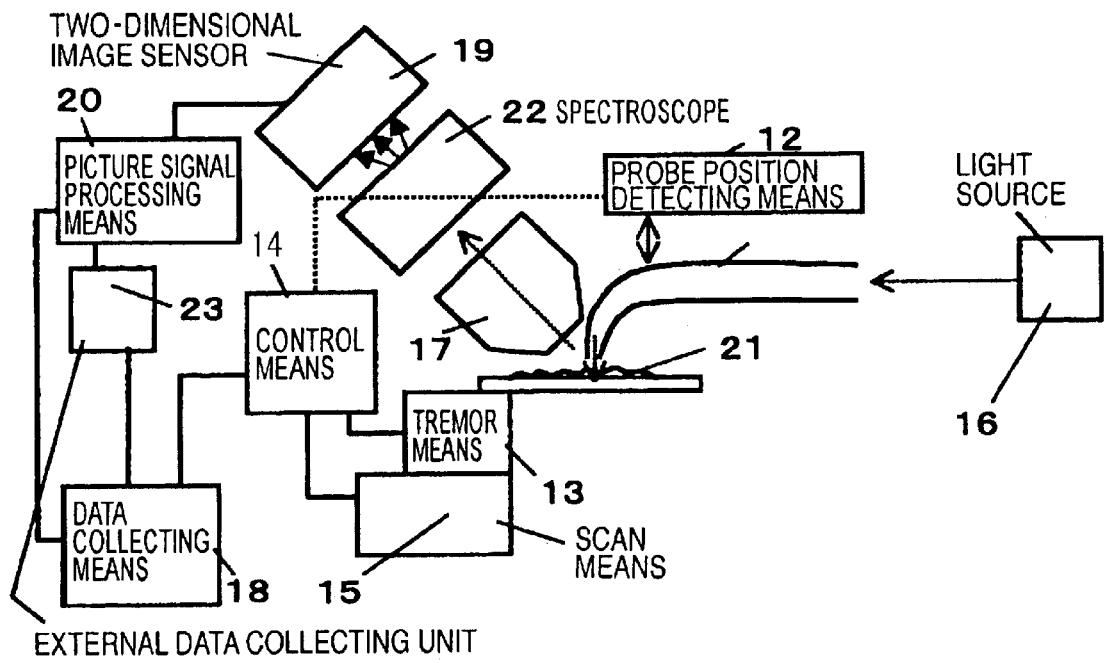
FIG. 9 is a diagram showing a constitution of the light probe microscope of the present invention.

Similarly, in FIG. 1 and FIG. 3, it is shown such that the converging optical system 17 converges the light having transmitted through the sample. However, as shown in FIG. 9, as to the converging optical system 17, a constitution converging the light reflected by the sample is also possible. In such a constitution, since an adjustment of the optical axis becomes particularly difficult, the system of the present invention is especially effective.

Figure 10:
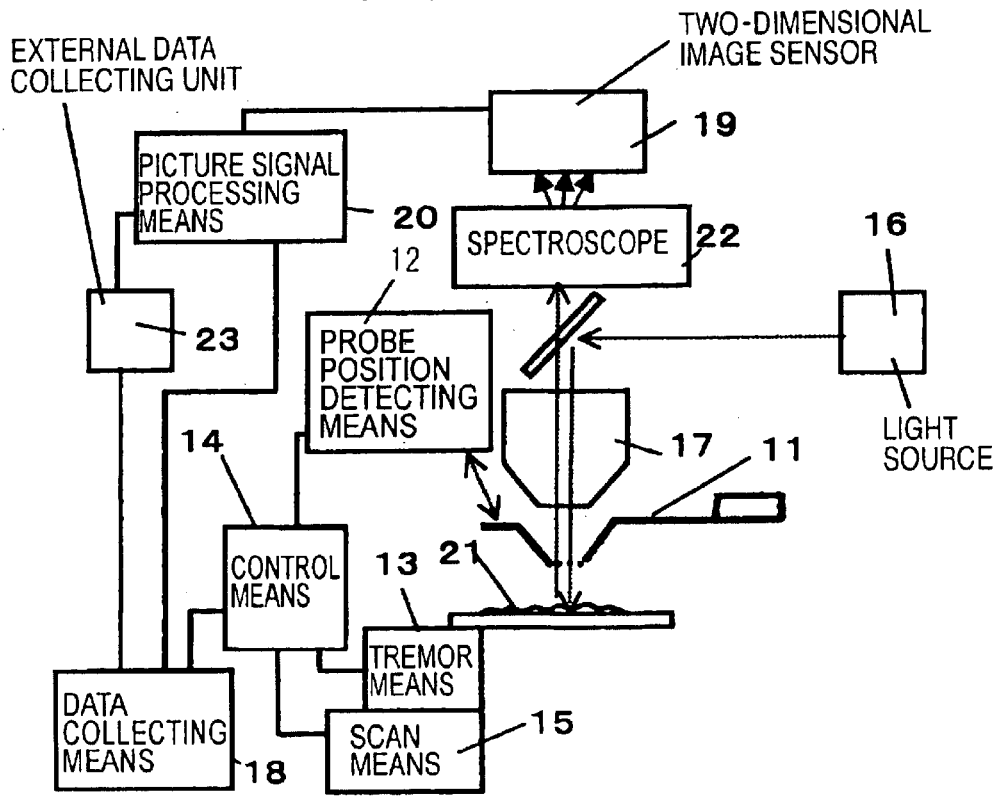
FIG. 10 is a diagram showing a constitution of the light probe microscope of the present invention.

Further, as shown in FIG. 10, a constitution in which the converging optical system 17 converges the light having passed through the optical aperture of the probe is also possible. In this case, the converging optical system 17 can function also as an incident optical system with respect to a direct incident type optical probe 50, and the light from the light source 16 and the signal light from the sample are separated by a functional mirror 51 composed of the dichroic mirror, the polarization beam splitter and the like.

Here, as the position detecting means 12, it is also possible to use piezoelectric detecting means integrated with the probe in addition to the optical means. Besides, in FIG. 10, there is adopted a constitution in which the light from the light source 16 reaches the sample through the converging optical system 17, but a constitution in which the light from the light source is directly irradiated from below the sample or from above the sample is possible as well.

For a distance control between the probe and the sample, it is possible to utilize a principle of interatomic force microscope. In addition, it is also possible to use a principle of scanning tunnel electron microscope.

As the two-dimensional image sensor, a CCD image sensor can be used and, in particular, it is possible to perform a highly sensitive detection by attaching an image intensifier to a front stage.

Incidentally, hitherto, in a spectral analysis, there is a method of obtaining a spectral curve by means of receiving a spectrum of the light from a spectroscope by the two-dimensional image sensor, and adding a signal in a direction perpendicular to a spectral distribution of the two-dimensional image sensor. However, the present invention is one in which a region where the probe tip is positioned is selected, and it is converted into an intensity signal in real time, thereby connecting it to an obtainment of the two-dimensional picture in the scanning region, so that it can be said that the present invention includes a completely different portion with respect to the related art and a portion in which the related art has been partly developed.

As explained above, by designating the measuring region in conformity with the bright point, it is possible to improve the problem that the excessive stray light is detected in case that the detector whose light-intercepting face is large with respect to the size of the bright point is used, and the problem of the optical axis alignment in case that the detector having a small light-intercepting face in the order of the bright point is used, so that an operability of the light probe microscope could be greatly improved. Further, it became also possible to simultaneously, easily obtain plural two-dimensional images of the spectral information.

What is claimed is:

1. A light probe microscope comprising:
   a probe having a tip portion and being capable of generating a light field in a vicinity of the tip portion;
   probe position detecting means for detecting a distance between the tip portion of the probe and a sample surface;
   control means for controlling the distance between the tip portion and the sample surface;

scan means for two-dimensionally scanning the probe with respect to the sample surface;

a light source for generating light used to produce the light field;

a converging optical system for converging light radiated from the sample surface in response to the light field;

a two-dimensional image sensor for producing a two-dimensional shape image of the sample surface in real time; and picture signal processing means for producing a two-dimensional light image in accordance with a signal intensity of a detection region in the two-dimensional shape image.

2. A light probe microscope according to claim 1; further comprising a spectroscope interposed between the radiated light and the two-dimensional image sensor for selectively obtaining a light signal of a specified wavelength.

3. A light probe microscope according to claim 1; wherein the converging optical system comprises a polarizer and a mirror arranged such that different polarization components of the radiated light form images in separate positions on the two-dimensional image sensor.

4. A light probe microscope according to claim 1; wherein the converging optical system comprises a dichroic mirror and another mirror arranged such that different wavelength components of the radiated light form images in separate positions on the two-dimensional image sensor.

5. A light probe microscope according to claim 1; wherein the picture signal processing means includes means for obtaining a signal intensity of a plurality of separate detection regions in the two-dimensional shape image and producing light images corresponding to the respective detection regions.

6. A light probe microscope according to claim 2; wherein the picture signal processing means includes means for obtaining a signal intensity of a plurality of separate detection regions in the two-dimensional shape image and producing light images corresponding to the respective detection regions.

7. A light probe microscope according to claim 3; wherein the picture signal processing means includes means for obtaining a signal intensity of a plurality of separate detection regions in the two-dimensional shape image and producing light images corresponding to the respective detection regions.

8. A light probe microscope according to claim 4; wherein the picture signal processing means includes means for obtaining a signal intensity of a plurality of separate detection regions in the two-dimensional shape image and producing light images corresponding to the respective detection regions.

9. A light probe microscope according to claim 1; wherein the two-dimensional shape image is a video signal, and is updated at a video rate.

10. A light probe microscope according to claim 1; further comprising data collecting means for obtaining the two-dimensional shape image and the two-dimensional light image; wherein the picture signal processing means includes means for digitizing a video signal, calculating a light intensity of the detection region, and transmitting the calculated light intensity to the data collecting means as a digital or analog value.

11. A light probe microscope according to claim 1; further comprising data collecting means for obtaining the two-dimensional shape image and the two-dimensional light image; and an external data collecting unit separate from the data collecting means for obtaining a picture synchronized with the shape image in accordance with data containing a trigger signal output by the data collecting means.

12. A light probe microscope according to claim 5; wherein the picture signal processing means includes means for obtaining a light image for all wavelength components of the light probe microscope by setting a detection region for each of the wavelength components.

13. A light probe microscope according to claim 6; wherein the picture signal processing means includes means for obtaining a light image for all wavelength components of the light probe microscope by setting a detection region for each of the wavelength components.

14. A light probe microscope according to claim 7; wherein the picture signal processing means includes means for obtaining a light image for all wavelength components of the light probe microscope by setting a detection region for each of the wavelength components.

15. A light probe microscope according to claim 8; wherein the picture signal processing means includes means for obtaining a light image for all wavelength components of the light probe microscope by setting a detection region for each of the wavelength components.

16. A light probe microscope according to claim 12; further comprising means for extracting a light spectrum from the light image at a measuring point in a scan region of the sample for plural wavelength components by continuously varying the spectrum in a wavelength axis direction.

17. A light probe microscope according to claim 13; further comprising means for extracting a light spectrum from the light image at a measuring point in a scan region of the sample for plural wavelength components by continuously varying the spectrum in a wavelength axis direction.

18. A light probe microscope according to claim 14; further comprising means for extracting a light spectrum from the light image at a measuring point in a scan region of the sample for plural wavelength components by continuously varying the spectrum in a wavelength axis direction.

19. A light probe microscope according to claim 15; further comprising means for extracting a light spectrum from the light image at a measuring point in a scan region of the sample for plural wavelength components by continuously varying the spectrum in a wavelength axis direction.

20. A light probe microscope according to claim 5; further comprising a spectroscope for setting a wavelength of excited light at the probe tip outside an image region of the two-dimensional image sensor so that an S/N ratio to a wavelength other than the excited light is improved.

21. A light probe microscope according to claim 6; further comprising a spectroscope for setting a wavelength of excited light at the probe tip outside an image region of the two-dimensional image sensor so that an S/N ratio to a wavelength other than the excited light is improved.

22. A light probe microscope according to claim 7; further comprising a spectroscope for setting a wavelength of excited light at the probe tip outside an image region of the two-dimensional image sensor so that an S/N ratio to a wavelength other than the excited light is improved.

23. A light probe microscope according to claim 8; further comprising a spectroscope for setting a wavelength of excited light at the probe tip outside an image region of the two-dimensional image sensor so that an S/N ratio to a wavelength other than the excited light is improved.

24. A light probe microscope according to claim 1; wherein the converging optical system is arranged to converge one of light that has been transmitted through the sample or reflected by the sample.

25. A light probe microscope according to claim 1; wherein the converging optical system is arranged to converge light that has passed through an optical aperture of the probe.

26. A light probe microscope according to claim 1; wherein an image at a selected portion of the two-dimensional image sensor is continuously preserved in accordance with a trigger signal.

27. A light probe microscope comprising: a probe having a tip; means for positioning the probe tip closely to a sample surface and causing two-dimensional scanning movement between the probe tip and the sample; a light source for emitting light to an area proximate the probe tip and the sample; a two-dimensional image sensor for receiving the light radiated from the sample and producing a two-dimensional image of the sample in accordance therewith; and means for producing a light image based on a signal intensity of light in a detection region of the two-dimensional image.

28. A light probe microscope according to claim 26; further comprising a spectroscope interposed between the sample and the two-dimensional image sensor for selectively obtaining a light signal of specified wavelength.

29. A light probe microscope according to claim 27; further comprising an optical system for converging light emitted by the sample surface in response to the emitted light.

30. A light probe microscope according to claim 29; wherein the optical system comprises a polarizer and a mirror arranged such that different polarization components of the converged light form images in separate positions on the two-dimensional image sensor.

31. A light probe microscope according to claim 29; wherein the optical system comprises a dichroic mirror and another mirror arranged such that different wavelength components of the converged light form images in separate positions on the two-dimensional image sensor.

32. A light probe microscope according to claim 27; wherein the means for producing the two-dimensional light image includes means for obtaining a signal intensity of a plurality of separate detection regions in the two-dimensional image and producing light images corresponding to the respective detection regions.

* * * * *